E. J. Dodge.
Upsetting Tires.

Nº 21,327.   Patented Aug. 31, 1858.

UNITED STATES PATENT OFFICE.

E. J. DODGE, OF PORT WASHINGTON, WISCONSIN.

UPSETTING CARRIAGE-TIRES.

Specification of Letters Patent No. 21,327, dated August 31, 1858.

*To all whom it may concern:*

Be it known that I, E. J. DODGE, of Port Washington, in the county of Ozaukee and State of Wisconsin, have invented a new and useful Improvement in Machines for Upsetting Carriage-Tires; and I do hereby declare that the following is a full, clear, and exact description of the same, reference being had to the accompanying drawings, forming a part of this specification, in which—

Figure 1:
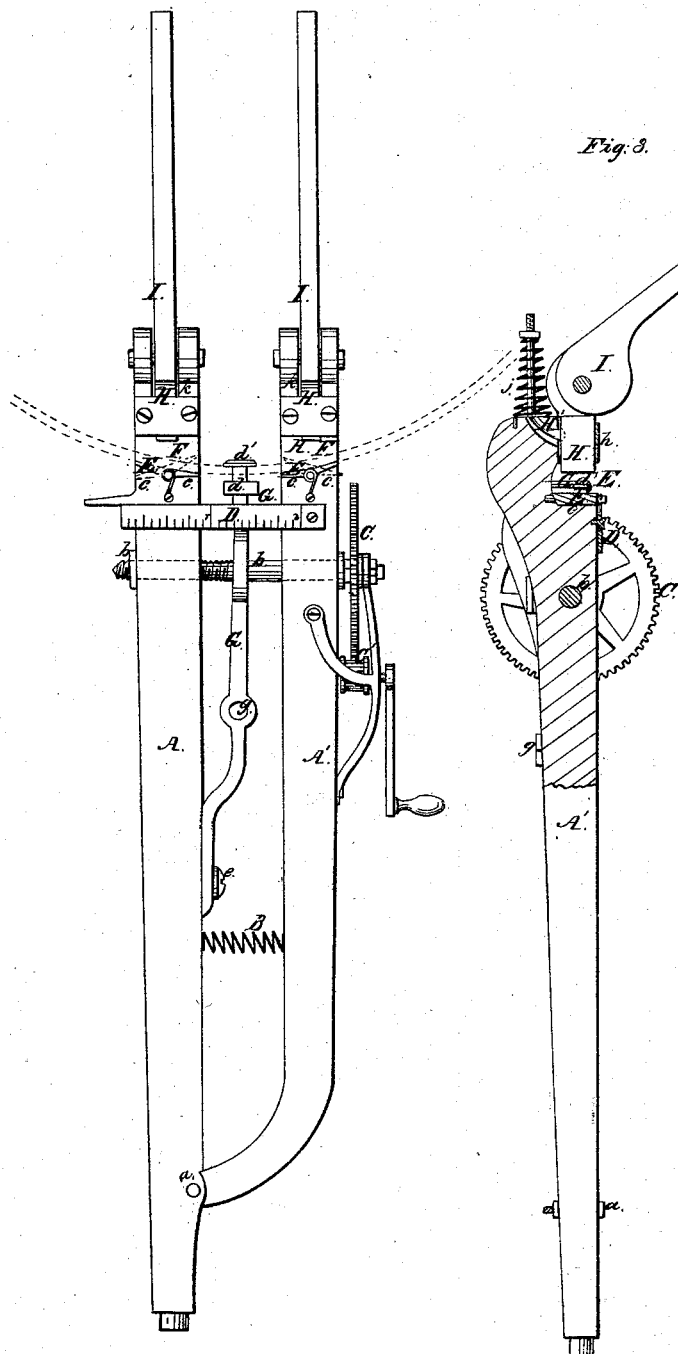
Figure 3:
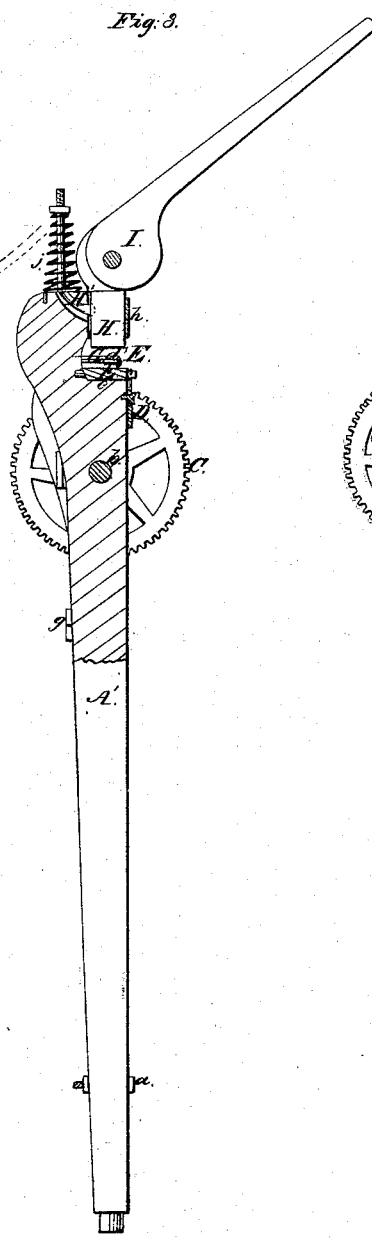
Figure 2:
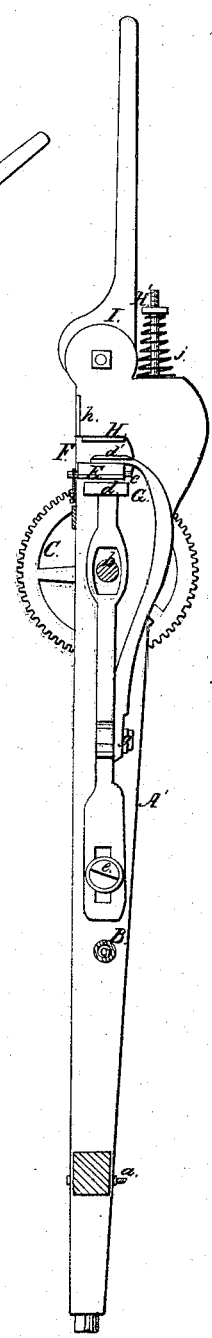

Figure 1, is a front elevation of an upsetting machine constructed with my improvement. Fig. 2, is a side elevation of the same. Fig. 3, is a vertical transverse section of the same.

Similar letters of reference in each of the several figures indicate corresponding parts.

Before stating the nature of my invention, I deem it proper to remark that I am aware that an upsetting machine constructed to operate on the principle of a vise is not new; and that my invention is intended to render more perfect the operation of the several parts employed in said machine.

The nature of my invention consists in arranging the anvil blocks or supports to rock on a center, in the manner specified, in combination with the arranging of the jaws of the intermediate guide or support to be adjusted separately or both together up and down as specified, whereby the machine is adapted to set tire and other articles of greater or less curvature and of different thicknesses.

To enable others, skilled in the art, to make and use my invention, I will proceed to describe its construction and operation.

A, A', represent two jaws pivoted together at $a$, and connected together at $b$, by screw and nut so as to operate similarly to a vise.

B, is a spring for facilitating the opening of the jaws as the screw $b$, is turned.

C, C', represent cog gearing for operating the screw and closing the jaws of the vise slowly.

D, is a gage plate attached fast to one jaw and sliding loosely over the other. This plate serves for indicating the extent to which the jaws are opened and closed, and thus the tire can always be upset to the exact extent desired without any labor or trouble. This however, is accomplished in the machine alluded to in the beginning of my specification.

E, E, represent two metal supports or anvils for the tire to rest upon as shown in red lines in Fig. 1. These supports are flat on their upper side but beveled from the center of their width to their edges and are introduced into recesses F, F, formed in the front part of the vise jaws, being arranged on the lower curved shoulders $c$, $c$, of the jaws and furnished with a fulcrum at the center of their width, on which to rock to the right or left in the path of a vertical circle. It is by beveling these supports or anvils and providing them with fulcra that they are rendered capable of adjusting themselves to suit the curvature of the tire, which varies according to the diameter of the wheel.

G, represents the intermediate guide or stop for preventing the tire changing its curved form while being upset. This guide consists of two adjustable jaws $d$, $d'$, arranged centrally between the jaws of the vise, the jaw $d$, being attached by slot and set screw $e$, to one of the vise jaws and held in place by the vise screw passing through it; a slot being provided for said screw to work in; and the jaw $d'$, is attached to the back side of $d$, at $g$, by means of set screw and slot. It is by thus arranging the guide or stop G, that its jaws can be adjusted to suit the different curvatures of tire and also thicknesses of the same.

H, H, represent two vertically sliding clamps for securing and confining the tire in place on the anvils while being upset. Each of these clamps has a curved stem or arm H¹, projecting outward and upward from its rear side, and they are arranged directly over the anvils in slots or grooves $h$, $h$, which communicate with the recesses in the vise jaws. The stems extending up through the top of the vise jaws and having each a strong spiral spring $j$, coiled around it, said spring bearing down upon the top of the vise jaws and being held at a tension by nuts screwed on the ends of the stems or projections H', H'.

I, I, are eccentric levers arranged directly over the clamps, and so as to come gradually in contact with the same as the levers are depressed from the position shown in Fig. 2, to that illustrated in Fig. 3. It is by thus employing eccentric levers and providing the clamp with projecting stems, and arranging springs on the same that the clamps can be instantly brought into action by hand, and as quickly thrown out of operation by the springs $j, j$. This feature of my invention is very useful since it is very important to perform the upsetting operation as expeditiously as possible in order to avoid cooling of the metal. When the clamps are brought into and thrown out of action by screws much delay occurs and the metal has a chance to cool.

From the foregoing description, it will be seen, that if the tire is placed in the machine as illustrated in red and clamped securely, that by turning the vise screw so as to bring the jaws of the vise together, the tire will be upset between the clamps. And if the tire be set so as to encircle the lower part of the vise, the supports or anvils will adjust themselves as illustrated in red. And if the curve be long or short they will accommodate themselves thereto.

What I claim as my invention and desire to secure by Letters Patent, is—

Arranging the anvil blocks or supports to rock on a center in the manner specified, in combination with the arranging of the jaws of the intermediate guide or support to be adjusted separately or both together up and down, substantially as and for the purposes set forth.

The above specification of my improvement in upsetting vise signed by me this fifteenth day of February 1858.

E. J. DODGE.

Witnesses:
L. TOWSLEY,
JAMES W. VAIL.